Dec. 2, 1930.  C. B. SCHNEIBLE  1,783,813
COLUMN
Filed May 16, 1927   2 Sheets-Sheet 1

Inventor,
Claude B. Schneible,
by Dyrenforth, Lee, Chritton & Niles,
Attys.

Dec. 2, 1930.    C. B. SCHNEIBLE    1,783,813
COLUMN
Filed May 16, 1927    2 Sheets-Sheet 2
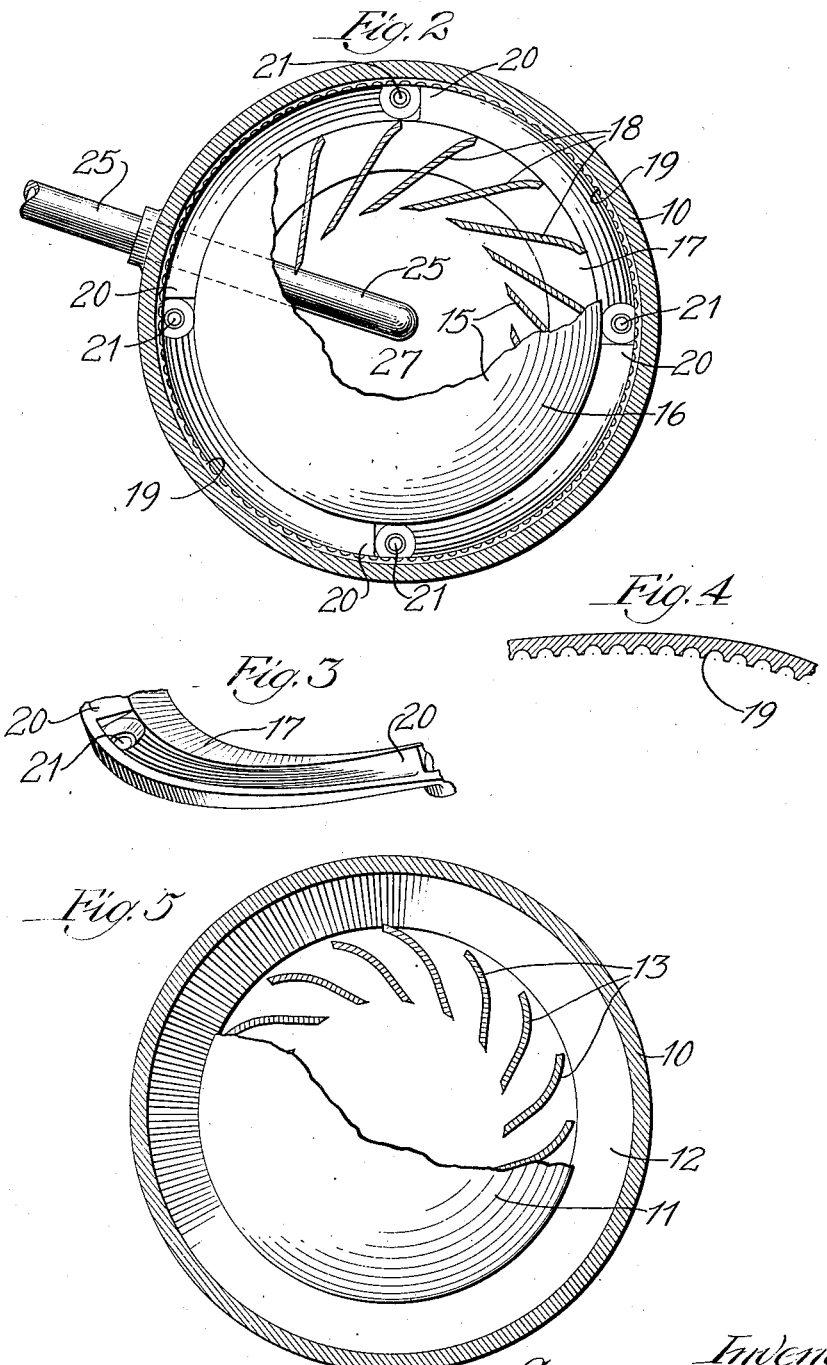

Patented Dec. 2, 1930

1,783,813

UNITED STATES PATENT OFFICE

CLAUDE B. SCHNEIBLE, OF EVANSTON, ILLINOIS, ASSIGNOR TO CLAUDE B. SCHNEIBLE, K. F. SCHREIER, AND BENJAMIN B. SCHNEIDER AS TRUSTEES UNDER THE NAME OF JOSEPH SCHNEIBLE TRUST

COLUMN

Application filed May 16, 1927. Serial No. 191,740.

This invention relates to improvements in columns, such as distilling columns, dephlegmating towers, scrubbing towers, absorption towers and similar towers.

In U. S. Patent No. 1,366,956, issued February 1, 1921, there is described a column containing a sequence of baffle plates alternately of the plate and baffle ring type, said baffle plates being downwardly inclined to prevent the accumulation of liquid. Curved vanes are provided between the plates and baffle rings therebeneath, said vanes lying in a general direction substantially inclined to radial direction, for the purpose of imparting a circular and whirling motion to the ascending vapors or gases whereby effective contact and interaction between the descending liquid and the ascending vapors or gases are attained.

In my co-pending applications Serial Nos. 191,738 and 191,739, filed of even date herewith, I have described columns of a similar type embodying certain improvements.

The purpose of the present invention is to provide further improvements applicable to columns of this type and to vapor liquid columns generally.

The invention will readily be understood from the following description of a preferred embodiment which is illustrated in the accompanying drawings, in which:

Figure 1 is a sectional elevation of a column embodying the invention.

Fig. 2 is a sectional view taken on the line 2—2 of Fig. 1, part of the plate 16 being broken away to show the vanes 18 therebeneath.

Fig. 3 is a perspective detail of the trough 20 in the plate 17.

Fig. 4 is a section on the line 4 of Fig. 1; and

Fig. 5 is a section on the line 5—5 of Fig. 1, part of the plate 11 being broken away to show the vanes therebeneath.

Figure 1:
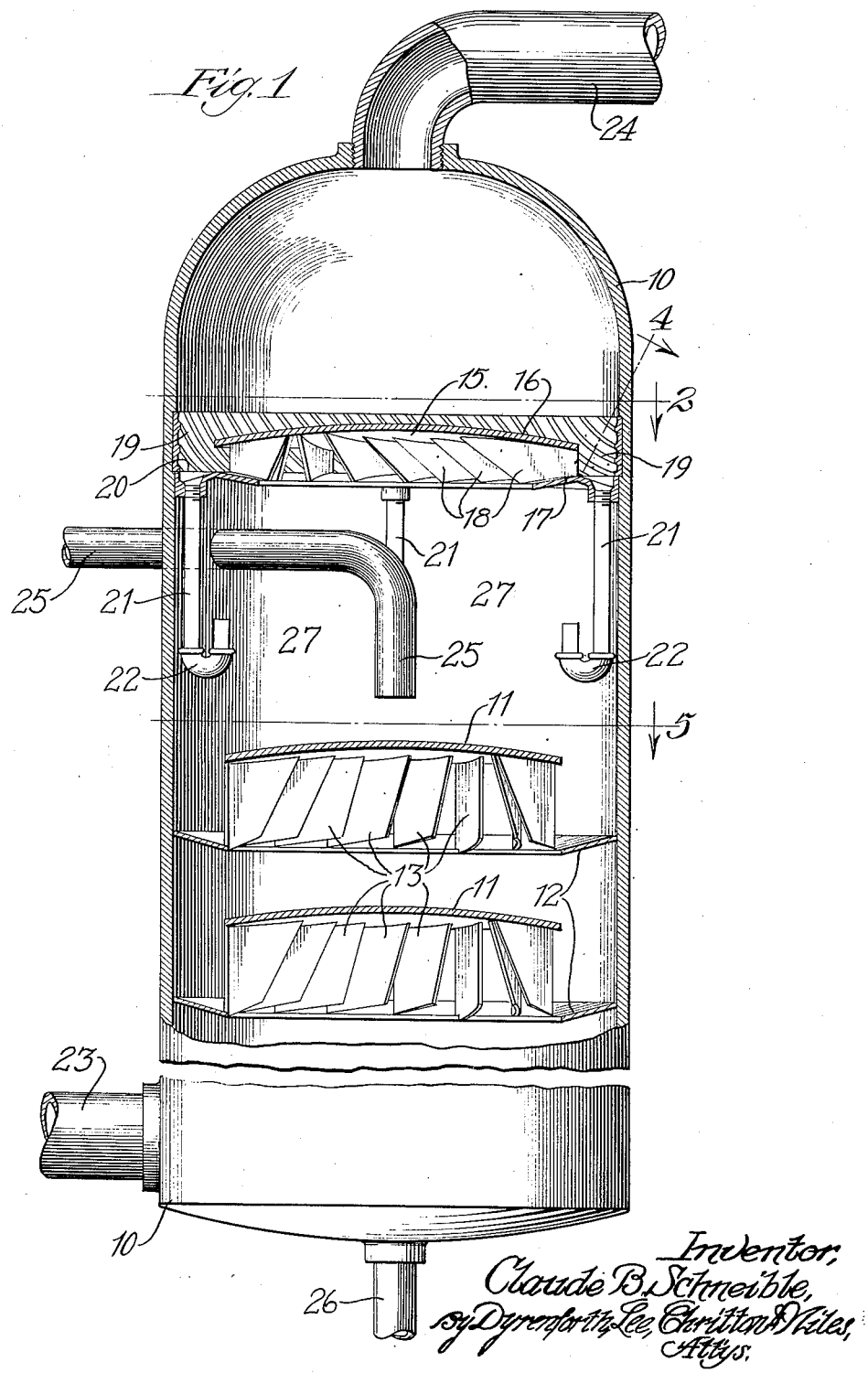

Referring to the drawings, 10 is a column provided with baffle plates 11 and 12 of the plate and ring type, vanes 13 being provided therebetween for the purpose of imparting a circular or whirling motion to the ascending vapors or gases. The arrangement of the plates and vanes illustrated is that described and claimed in my co-pending application Serial No. 191,739, but it must be understood that the present invention is not limited thereto since any column of the same general type or any other column may be employed in conjunction with the present invention.

Above the fractionating elements constituted by the plates 11, rings 12 and vanes 13 is located a liquid separator referred to generally as 15. The separator 15 comprises a plate 16 and a ring 17, preferably overlapping considerably and positioned relatively close together for the purpose of constricting the flow-path of vapors passing therebetween and increasing their velocity. Associated with the plate 16 and ring 17, and preferably located substantially therebetween, are a number of vanes 18 which are sharply inclined to the radial direction so as to impart a circular and whirling motion to the rapidly flowing vapors.

On the upper side of plate 17 and adjacent to the space between the plates 16 and 17, and preferably for some distance above the plate 16, the inner surface of the column 10 may be provided with grooves 19. These grooves extend obliquely, leading downwardly in the same sense as the circular motion imparted to the vapors. The ring 17 slopes upwardly from its inner periphery for a short distance and then slopes downwardly outwardly toward the wall of the column 10, said slope varying as follows. Referring to Fig. 2, the part 20 of the ring 17 is practically horizontal but proceeding in clock-wise direction through 90° the pitch gradually increases until it attains maximum slope, forming a relatively deep trough. At the deepest point this trough is provided with a liquid draw-off pipe 21 which extends below the plate 17 and is provided with a liquid seal constituted by the upturned end 22. As illustrated, the plate 17 comprises four gradually depending troughs and has four pipes 21 leading therefrom.

The vanes 13 and 18 may be arranged to cause rotation in opposite directions and the separator 15 may be located substantially above the uppermost plate 11, constituting a space 27 therebetween.

The column may be provided with a vapor supply pipe 23, a vapor outlet pipe 24 above the liquid separator 15, a liquid inlet pipe 25 which feeds into the column below the liquid separator 15 and a liquid outlet 26.

The operation is as follows. Liquid is supplied by the pipe 25 and vapors by the pipe 23. The liquid and vapors are thoroughly contacted and agitated together while passing over and between the plates 11 and 12, such agitation and commingling being effected and enhanced by the circular motion imparted to the ascending vapors by the vanes 13. After being subjected to this treatment the vapors carrying more or less entrainment, pass upwardly to the liquid separator 15. Here the vapors have imparted thereto a substantial additional velocity which exerts a centrifugal effect, throwing the entrained liquid particles outwardly under the action of the vanes 18. The movement of these vapors has an outward component so that the entrained liquid particles are carried into the grooves 19 and are carried downwardly to the trough in the plate 17, adjacent the wall of the column. This entrained liquid flows under the influence of the circular motion of the vapors along these troughs until it arrives at one of the pipes 21. Thereupon it flows downwardly therethrough and joins the liquid introduced by the pipe 25 in its flow through the column.

If the vanes 13 and 18 are arranged to cause rotation in opposite directions, the vapors at the top and bottom of the space 27 rotate in opposite directions. Accordingly an intermediate quiescent zone is produced in space 27 which permits some entrained liquid to separate therefrom.

Although the present invention has been described in connection with the details of a specific embodiment thereof, it is not intended that such details shall be regarded as limitations upon the scope of the invention except in so far as included in the accompanying claims.

I claim:

1. A liquid separator for a column of the type described, comprising a baffle ring and a baffle plate, vanes between said ring and plate and inclined to the radial direction, said baffle ring forming a trough adjacent the wall of the column for the purpose of receiving precipitated entrained liquid, and conduit means for withdrawing liquid from said trough.

2. A liquid separator for columns of the type described, comprising a baffle ring and a baffle plate thereabove, vanes inclined to the radial direction between said ring and plate, a wall at the outer periphery of said ring provided with grooves for the reception of entrained liquid, said grooves sloping downwardly toward said ring for the purpose of conducting said liquid downwardly thereto.

3. A liquid separator for columns of the type described, comprising a baffle ring, a baffle plate and vanes therebetween adapted to impart a circular motion to vapors passing between said plate and ring, said ring comprising near its outer periphery, a trough of gradually increasing depth and a liquid sealed conduit extending from the deepest part of said trough to the underside of said liquid separator.

4. A liquid separator for columns of the type described, comprising a baffle ring, a baffle plate and vanes therebetween adapted to impart a circular motion to vapors passing between said plate and ring, said ring comprising near its outer periphery, a plurality of troughs of gradually increasing depth and liquid sealed conduits extending from the deepest part of said troughs to the outside of said liquid separator.

5. In a column comprising a series of devices for contacting descending liquid with ascending vapors, a liquid separator above said devices, said separator comprising a baffle ring, a baffle plate in close proximity thereto, a number of vanes inclined to the radial direction for the purpose of imparting a strong circular motion to the vapors, and guides spaced apart from said vanes and adapted to receive the impact of the whirling vapors and to abstract the liquid therefrom and to guide said liquid downwardly.

6. A liquid separator for a column of the type described, comprising a baffle ring and a baffle plate, vanes between said ring and plate and inclined to the radial direction, said baffle ring forming a trough adjacent the wall of the column for the purpose of receiving precipitated entrained liquid, guide means on said wall for conducting said liquid into said trough, and conduit means for withdrawing liquid from said trough.

7. A liquid separator for columns of the type described, comprising a baffle ring, a baffle plate, vanes therebetween adapted to impart a circular motion to vapors passing between said plate and ring, said ring comprising near its outer periphery a trough of gradually increasing depth, guide means near said outer periphery for conducting said liquid into said trough, and a sealed conduit extending from the deepest part of said trough to the underside of said liquid separator.

8. In a column comprising a superimposed series of means for intimately contacting descending liquid with ascending vapors and imparting a circular motion to said vapors, means for supplying liquid to said contacting means and a liquid separator above said liquid supply means and contacting means, said liquid separator comprising a pair of baffle plates of the ring and plate type so positioned relatively one to the other as to increase substantially the velocity of the vapors passing therebetween, and vanes inclined to the radial direction for the purpose of applying a circular motion to said vapors opposite to the motion imparted to the vapors as they leave said contacting means, whereby the liquid entrained is projected against the wall of the column, and means for withdrawing said liquid.

9. In a column comprising means for intimately treating descending liquid with ascending vapors and adapted to impart a whirling motion to the ascending vapors, a liquid separator above said means and comprising vanes adapted to impart an opposite whirling motion to the vapors whereby entrained liquid particles are removed therefrom.

10. In a column for intimately treating descending liquid with ascending vapors, comprising a series of baffle plates alternately of the plate and ring type, vanes associated with said baffle plates and adapted to impart a whirling motion to the ascending vapors and a liquid separator located above said baffle plates so as to constitute a substantial space therebetween, said separator comprising a plate and ring positioned one with respect to the other so as to increase substantially the velocity of the vapors passing therebetween, and vanes for imparting a strong whirling motion opposite to the first said whirling motion, whereby liquid entrainment is separated out of said vapors by centrifugal action and a quiescent zone is produced in said space below the separator.

11. In a column for intimately treating descending liquid with ascending vapors, comprising a series of baffle plates alternately of the plate and ring type, vanes associated with said baffle plates and adapted to impart a whirling motion to the ascending vapors, a liquid separator located above said baffle plates so as to constitute a substantial space therebetween, and means to supply liquid to said baffle plates at a point below said separator, said separator comprising a plate and ring positioned one with respect to the other so as to increase substantially the velocity of the vapors passing therebetween, and vanes for imparting a strong whirling motion opposite to the first said whirling motion, whereby liquid entrainment is separated out of said vapors by centrifugal action and a quiescent zone is produced in said space below the separator.

In testimony whereof I have hereunto set my hand this 12th day of May, 1927.

CLAUDE B. SCHNEIBLE.